United States Patent
Lee et al.

(10) Patent No.: US 12,182,730 B2
(45) Date of Patent: Dec. 31, 2024

(54) ELECTRONIC DEVICE FOR DISTRIBUTED PROCESSING OF ARTIFICIAL INTELLIGENCE MODEL AND OPERATION METHOD OF THE ELECTRONIC DEVICE

(71) Applicant: Samsung Electronics Co., Ltd., Suwon-si (KR)

(72) Inventors: Sungho Lee, Suwon-si (KR); Semun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 918 days.

(21) Appl. No.: 17/242,803

(22) Filed: Apr. 28, 2021

(65) Prior Publication Data

US 2022/0147844 A1 May 12, 2022

(30) Foreign Application Priority Data

Nov. 12, 2020 (KR) .......................... 10-2020-0150998

(51) Int. Cl.
  *G06N 5/04* (2023.01)
  *G06N 20/00* (2019.01)

(52) U.S. Cl.
  CPC ............... *G06N 5/04* (2013.01); *G06N 20/00* (2019.01)

(58) Field of Classification Search
  CPC .................................. G06N 5/04; G06N 20/00
  See application file for complete search history.

(56) References Cited

U.S. PATENT DOCUMENTS

| | | | | |
|---|---|---|---|---|
| 9,588,823 | B2* | 3/2017 | Rajappa | ................ G06F 9/5083 |
| 10,354,186 | B2* | 7/2019 | Vasudevan | ............ G06F 9/5038 |
| 10,373,053 | B2* | 8/2019 | Barham | ................. G06N 3/063 |
| 11,769,061 | B2* | 9/2023 | Tucker | ................... G06N 3/084 |
| | | | | 706/19 |

(Continued)

FOREIGN PATENT DOCUMENTS

| | | |
|---|---|---|
| JP | 5-108595 | 4/1993 |
| KR | 10-2019-0093932 | 8/2019 |

(Continued)

OTHER PUBLICATIONS

International Search Report and Written Opinion dated Aug. 11, 2021 in corresponding International Application No. PCT/KR2021/005354.

*Primary Examiner* — Jeremy L Stanley
(74) *Attorney, Agent, or Firm* — Nixon & Vanderhye, P.C.

(57) ABSTRACT

A method for distributed processing of an artificial intelligence model includes: obtaining an artificial intelligence model to be distributed and processed, dividing the artificial intelligence model to obtain a plurality of submodels processable in parallel, determining a first processing device to process a first submodel requiring a greatest amount of computations from among the plurality of submodels, predicting a first processing time required for the first processing device to process the first submodel, determining a second processing device to process a second submodel from among the plurality of submodels based on the predicted first processing time, and performing the distributed processing of the artificial intelligence model by requesting the first processing device and the second processing device to process the first submodel and the second submodel, respectively.

13 Claims, 7 Drawing Sheets

(56) References Cited

U.S. PATENT DOCUMENTS

| | | | |
|---|---|---|---|
| 2008/0065833 A1* | 3/2008 | Hosoki | G06F 12/0864 711/E12.018 |
| 2008/0263555 A1* | 10/2008 | Ventroux | G06F 9/5038 718/103 |
| 2012/0284728 A1* | 11/2012 | Tchidjo Moyo | G06F 9/4887 718/103 |
| 2015/0193695 A1* | 7/2015 | Cruz Mota | H04L 63/1425 706/12 |
| 2015/0213360 A1* | 7/2015 | Venanzi | G06Q 10/06311 706/46 |
| 2016/0188379 A1* | 6/2016 | Rajappa | G06F 9/522 718/107 |
| 2016/0321776 A1* | 11/2016 | Zou | G06F 9/522 |
| 2016/0321777 A1* | 11/2016 | Jin | G06T 1/20 |
| 2017/0124451 A1* | 5/2017 | Barham | G06N 3/063 |
| 2017/0124452 A1* | 5/2017 | Tucker | G06N 3/098 |
| 2017/0124454 A1* | 5/2017 | Vasudevan | G06F 9/5066 |
| 2018/0331897 A1* | 11/2018 | Zhang | G06N 20/00 |
| 2018/0349189 A1* | 12/2018 | Rossi | G06N 3/063 |
| 2019/0026624 A1* | 1/2019 | Steiner | G06F 9/5066 |
| 2019/0205737 A1* | 7/2019 | Bleiweiss | G06N 3/044 |
| 2019/0286086 A1* | 9/2019 | Gardner | G05B 17/02 |
| 2019/0286973 A1* | 9/2019 | Kovvuri | G06N 3/04 |
| 2019/0378210 A1* | 12/2019 | Merrill | G06N 5/01 |
| 2020/0065671 A1* | 2/2020 | Sahni | G06N 5/043 |
| 2020/0082273 A1* | 3/2020 | Rossi | G06F 9/5038 |
| 2020/0111030 A1* | 4/2020 | Starosta | G06N 5/01 |
| 2020/0118000 A1* | 4/2020 | Schmidt | G06F 9/546 |
| 2020/0249936 A1* | 8/2020 | Barfield, Jr. | G06F 8/60 |
| 2020/0265336 A1* | 8/2020 | Merrill | G06N 5/045 |
| 2020/0279163 A1* | 9/2020 | Bengio | G06N 3/045 |
| 2020/0302302 A1* | 9/2020 | Tucker | G06F 9/5066 |
| 2020/0342322 A1* | 10/2020 | Han | G06N 3/10 |
| 2020/0356875 A1* | 11/2020 | Wang | G06N 5/04 |
| 2021/0019184 A1* | 1/2021 | Vee | G06F 16/9024 |
| 2021/0042620 A1* | 2/2021 | Chen | G06N 3/08 |
| 2021/0064997 A1* | 3/2021 | Lee | G06N 3/063 |
| 2021/0073028 A1* | 3/2021 | Li | G06N 3/08 |
| 2021/0089969 A1* | 3/2021 | Sengupta | G06F 3/04817 |
| 2021/0133555 A1* | 5/2021 | Qiu | G06N 3/082 |
| 2021/0210170 A1* | 7/2021 | Gardner | G16H 70/40 |
| 2021/0248002 A1* | 8/2021 | Li | G06F 9/5027 |
| 2021/0304066 A1* | 9/2021 | Tomioka | G06F 9/5066 |
| 2021/0319098 A1* | 10/2021 | Pogorelik | G06N 3/094 |
| 2021/0382754 A1* | 12/2021 | Nimmagadda | G06F 9/5016 |
| 2021/0390460 A1* | 12/2021 | Nimmagadda | G06F 18/2163 |
| 2022/0083917 A1* | 3/2022 | Ben-Itzhak | G06N 20/20 |
| 2022/0092414 A1* | 3/2022 | Zheng | G06N 3/08 |
| 2022/0138550 A1* | 5/2022 | Zhang | G06N 3/063 706/25 |
| 2022/0343165 A1* | 10/2022 | Hu | G06N 3/045 |
| 2022/0357985 A1* | 11/2022 | Dean | G06F 9/5072 |
| 2022/0383082 A1* | 12/2022 | Zhang | G06N 3/045 |
| 2023/0024350 A1* | 1/2023 | Li | G06F 9/5038 |
| 2023/0105476 A1* | 4/2023 | Anil | G06N 3/006 718/102 |
| 2023/0195537 A1* | 6/2023 | Wang | G06F 9/5083 718/105 |
| 2023/0206132 A1* | 6/2023 | Zhu | G06F 9/5061 706/12 |
| 2023/0275812 A1* | 8/2023 | Filoche | G06N 3/045 706/12 |
| 2023/0316450 A1* | 10/2023 | Zhang | G06N 3/098 706/16 |
| 2024/0054384 A1* | 2/2024 | Catron | G06N 3/045 |

FOREIGN PATENT DOCUMENTS

| | | |
|---|---|---|
| KR | 10-2019-0113928 | 10/2019 |
| KR | 10-2020-0023239 | 3/2020 |
| KR | 10-2020-0104734 | 9/2020 |
| WO | 2020/040599 | 2/2020 |

* cited by examiner

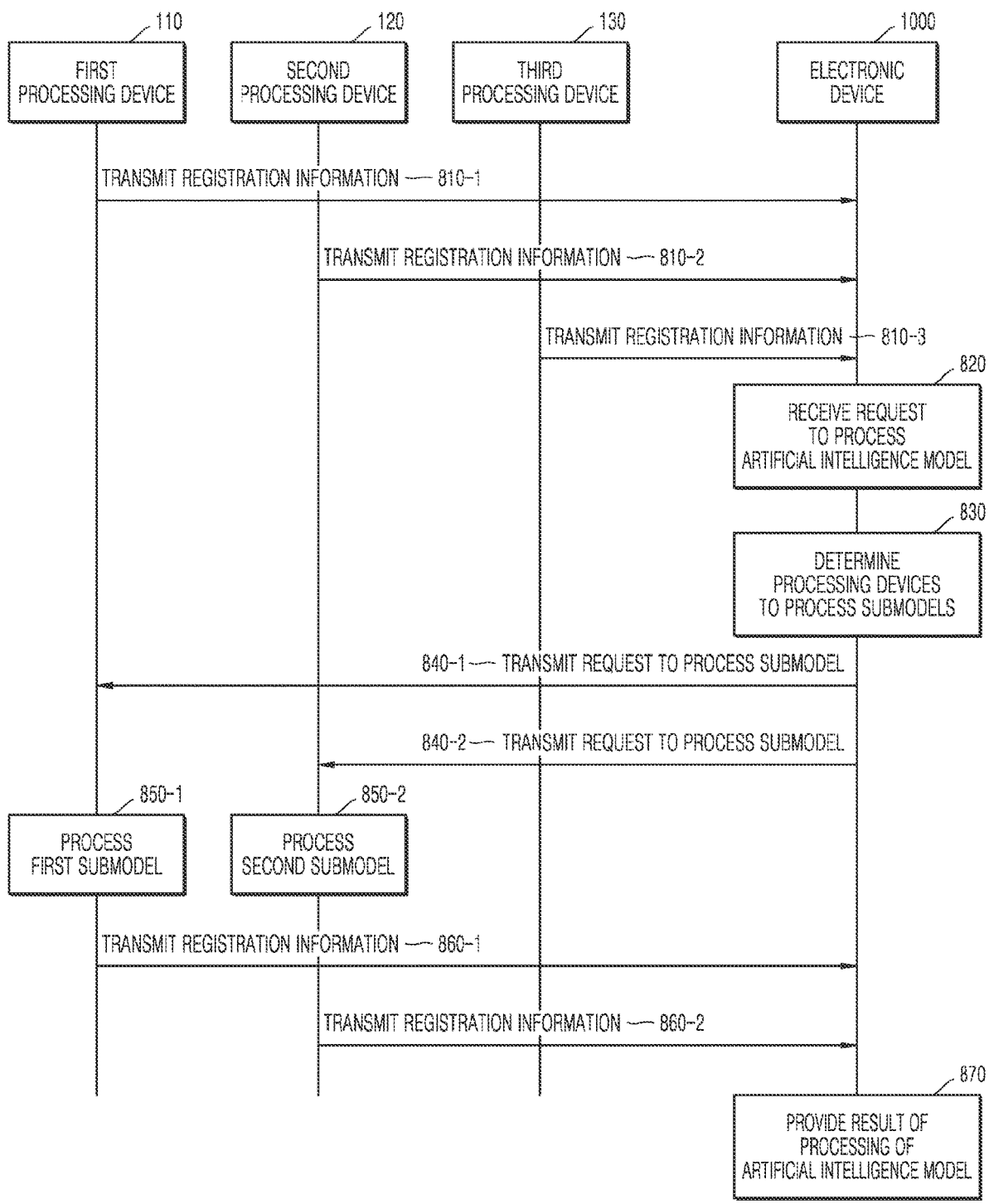

ELECTRONIC DEVICE FOR DISTRIBUTED PROCESSING OF ARTIFICIAL INTELLIGENCE MODEL AND OPERATION METHOD OF THE ELECTRONIC DEVICE

CROSS-REFERENCE TO RELATED APPLICATION

This application is based on and claims priority under 35 U.S.C. § 119 to Korean Patent Application No. 10-2020-0150998, filed on Nov. 12, 2020, in the Korean Intellectual Property Office, the disclosure of which is incorporated by reference herein in its entirety.

BACKGROUND

1. Field

The disclosure relates to an electronic device for distributed processing of an artificial intelligence model, and an operation method of the electronic device.

2. Description of Related Art

Using on-device AI technology, various data may be processed based on an artificial intelligence model provided in an electronic device without data transmission and reception with an external server. For example, the electronic device may perform various operations in real time according to an artificial intelligence model included in the electronic device and a hardware configuration of the electronic device without using an external server device. Therefore, according to the on-device AI technology, as the electronic device operates by itself, data, which may include a user's sensitive information collected by the electronic device, is not transmitted to the outside, and thus, there is an advantage in terms of user privacy and data processing speed.

However, when the artificial intelligence model is processed by the electronic device according to the on-device AI technology, the processing performance is limited according to the hardware provided in the electronic device.

Therefore, there is a need for a method of processing an artificial intelligence model, capable of minimizing and/or reducing the limitation of the processing performance according to the hardware of an electronic device while maintaining the advantages of the on-device AI technology in terms of protection of user's personal information and data processing speed.

SUMMARY

Embodiments of the disclosure provide a system for distributed processing of an artificial intelligence model.

Embodiments of the disclosure provide a non-transitory computer-readable recording medium having recorded thereon a program for executing the method on a computer. Aspects of the disclosure are not limited to the above.

Additional aspects will be set forth in part in the description which follows and, in part, will be apparent from the description.

According to an example embodiment, a method by which an electronic device performs distributed processing of an artificial intelligence model may include: obtaining an artificial intelligence model to be distributed and processed; dividing the artificial intelligence model to obtain a plurality of submodels processable in parallel; determining a first processing device to process a first submodel that requires a greatest amount of computation from among the plurality of submodels; predicting a first processing time required for the first processing device to process the first submodel; determining a second processing device to process a second submodel from among the plurality of submodels based on the predicted first processing time; and performing the distributed processing of the artificial intelligence model by requesting the first processing device and the second processing device to process the first submodel and the second submodel, respectively.

According to an example embodiment, an electronic device configured to perform distributed processing of an artificial intelligence model may include: a memory storing information about an artificial intelligence model to be distributed and processed; at least one processor configured to: divide the artificial intelligence model to obtain a plurality of submodels processable in parallel, determine a first processing device to process a first submodel that requires a greatest amount of computation from among the plurality of submodels, predict a first processing time required for the first processing device to process the first submodel, and determine a second processing device to process a second submodel from among the plurality of submodels based on the predicted first processing time; and a communication unit comprising circuitry configured to transmit, to the first processing device and the second processing device, information for requesting to process the first submodel and the second submodel, respectively.

According to an example embodiment, there is provided a non-transitory computer-readable recording medium having recorded thereon a program for executing the method according to the first aspect of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8 is a signal flow diagram illustrating an example method of performing distributed processing of an artificial intelligence model using a plurality of processing devices, according to various embodiments.

DETAILED DESCRIPTION

Figure 1:
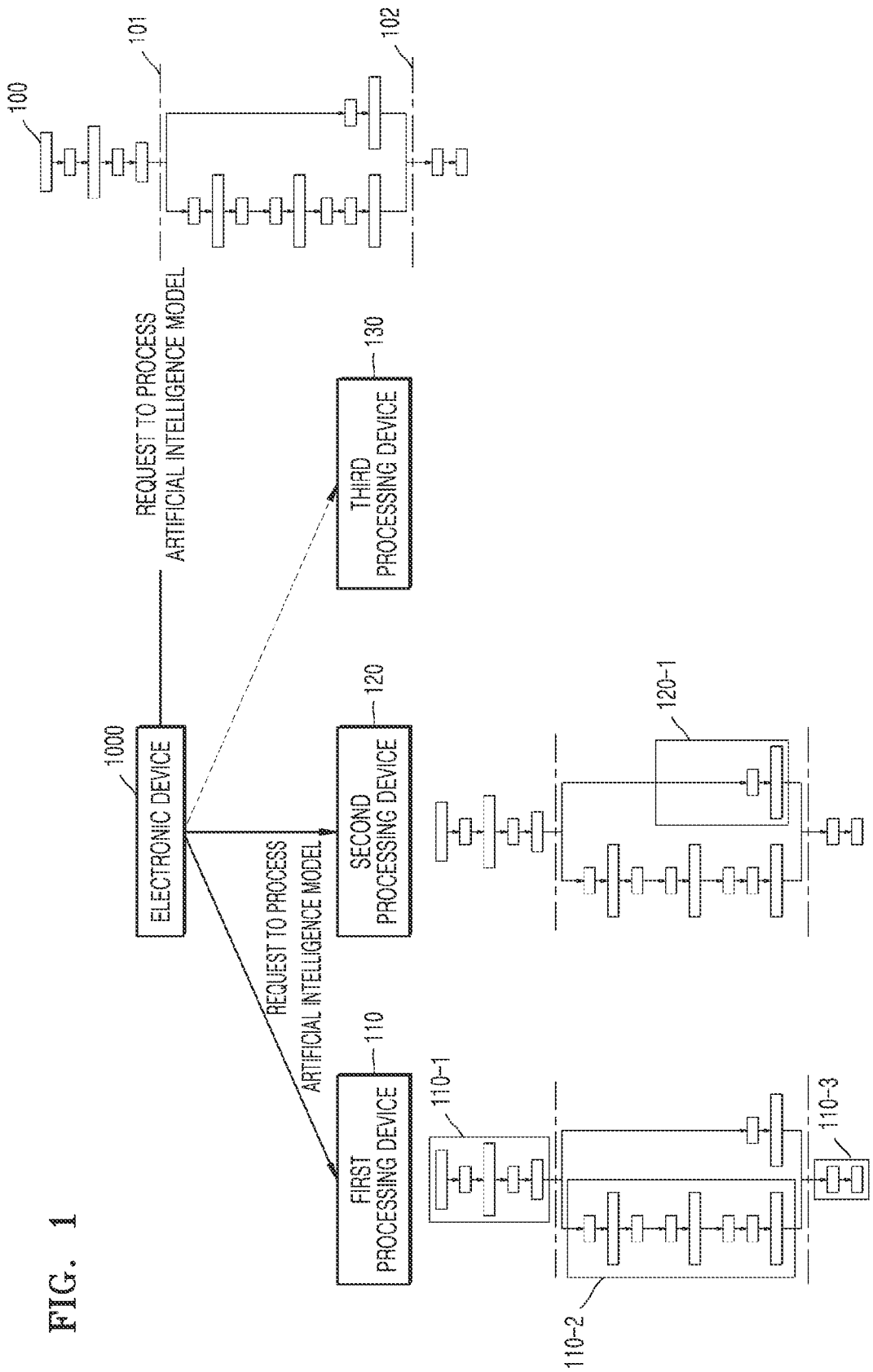
FIG. 1 is a block diagram illustrating an example of performing distributed processing of an artificial intelligence model, according to various embodiments.

Hereinafter, various example embodiments of the disclosure will be described in greater detail with reference to the accompanying drawings. The disclosure may, however, be embodied in many different forms and should not be understood as being limited to the example embodiments set forth herein. In the drawings, portions not related to the disclosure may not be illustrated for clarity of explanation, and like reference numerals denote like elements.

Throughout the disclosure, it will be understood that when an element is referred to as "being connected to" another element, it may be "directly connected to" the other element or be "electrically connected to" the other element through an intervening element. In addition, when an element is referred to as "including" an element, other elements may be further included not excluded unless there is a specific description.

Throughout the disclosure, the expression "at least one of a, b or c" indicates only a, only b, only c, both a and b, both a and c, both b and c, all of a, b, and c, or variations thereof.

Hereinafter, the disclosure will be described in greater detail with reference to the accompanying drawings.

FIG. 1 is a block diagram illustrating an example of performing distributed processing of an artificial intelligence model 100, according to various embodiments.

Referring to FIG. 1, an electronic device 1000 according to an embodiment may provide a user with various services based on a result of processing the artificial intelligence model 100, by processing the artificial intelligence model 100 using a plurality of processing devices.

The electronic device 1000 according to an embodiment may be implemented in various forms. For example, the electronic device 1000 may include, for example, and without limitation, a digital camera, a smart phone, a smart TV, a laptop computer, a tablet PC, an electronic book terminal, a digital broadcasting terminal, a personal digital assistant (PDA), a portable multimedia player (PMP), a navigation device, an MP3 player, a vehicle, or the like, but is not limited thereto. The electronic device 1000 may be a wearable device that may be worn by a user. The wearable device may include at least one of an accessory-type device (e.g., a watch, a ring, a cuff band, an ankle band, a necklace, spectacles, and contact lenses), a head-mounted-device (HMD), a textile or garment-integrated device (e.g., electronic garments), a body attachment device (e.g., a skin pad), or a bioimplantable device (e.g., an implantable circuit) but is not limited thereto.

The electronic device 1000 according to an embodiment may identify one or more processing devices 110, 120, and 130 (hereinafter, also referred to as the first, second, and third processing devices 110, 120, and 130) that may perform distributed processing of the artificial intelligence model 100. The electronic device 1000 according to an embodiment may be identified as the one or more processing devices 110, 120, and 130. Hereinafter, a case where devices other than the electronic device 1000 are identified as the one or more processing devices 110, 120, and 130 will be described by way of non-limiting example.

The one or more processing devices 110, 120, and 130 according to an embodiment may be identified from those that share, with the electronic device 1000, an internal network that is inaccessible to external devices, or those that are physically close to the electronic device 1000. For example, in a case where the electronic device 1000 is in a house and connected to a home network, the one or more processing devices 110, 120, and 130 may be identified from various home appliances (e.g., a TV, a refrigerator, a washing machine, a robot vacuum cleaner, a desktop computer, a smart speaker, a smartphone, or a tablet), or the like, that are in the house and connected to the home network, like the electronic device 1000.

Accordingly, because the electronic device 1000 according to an embodiment does not need to transmit data to an external network to process the artificial intelligence model 100, the risk that the data, which may contain a user's sensitive information, may be leaked in the transmission of the data to the external network, may be eliminated and/or reduced.

The electronic device 1000 according to an embodiment may obtain capability information of the one or more processing devices 110, 120, and 130, which are identified. The electronic device 1000 may determine at least one processing device to be requested for the distributed processing of the artificial intelligence model 100, based on the capability information of each of the one or more processing devices 110, 120, and 130.

The capability information of each of the one or more processing devices 110, 120, and 130 according to an embodiment may, for example, include information related to a processing capability of each processing device with respect to the artificial intelligence model 100. For example, the capability information may include identification information for identifying each processing device (e.g., a desktop computer, an air purifier, a refrigerator), information about hardware (e.g., a central processing unit (CPU), a graphics processing unit (GPU), a memory) included in each processing device, information about software (e.g., operating system information) in each processing device, network information (e.g., an Internet protocol (IP) address, a network speed, etc.), or the like, of each processing device.

According to an embodiment, the capability information may be changed in real time, and may include information related to the state of each of the one or more processing devices 110, 120, and 130, which is related to the processing capability of each processing device with respect to the artificial intelligence model 100. For example, the capability information may include various pieces of information related to an operation of performing the distributed processing of the artificial intelligence model 100 by each of the one or more processing devices 110, 120, and 130, for example, a battery state of charge, the number of currently running processes, or the size of a currently available memory.

The capability information of each of the one or more processing devices 110, 120, and 130 may include various types of information that may be used for performing the distributed processing of the artificial intelligence model 100.

The capability information according to an embodiment may be changed in real time according to a change in the situation of each of the one or more processing devices 110, 120, and 130. Accordingly, each of the one or more processing devices 110, 120, and 130 may provide the electronic device 1000 with the capability information that may be changed in real time, periodically or whenever a change in the capability information reaches a reference value.

The electronic device 1000 according to an embodiment may perform an operation for the distributed processing of the artificial intelligence model 100, upon receipt of a request to process the artificial intelligence model 100 from, for example, the outside. However, the disclosure is not limited thereto, and, in a case where processing of the artificial intelligence model 100 is required according to an internal operation of the electronic device 1000, the electronic device 1000 may perform the operation for the distributed processing of the artificial intelligence model 100 according to an embodiment.

According to an embodiment, the artificial intelligence model 100 to be distributed and processed may include an entire artificial intelligence model that is to be processed to perform an operation, but is not limited thereto, and may include a portion of the entire artificial intelligence model.

The artificial intelligence model 100 according to an embodiment may be configured based on a combination of a plurality of operators that process input information, for example, and without limitation, convolution operators, rectified linear unit (ReLU) operators, max pooling operators, or the like. The artificial intelligence model 100 is not limited to the above-described examples, and may include various types of elements.

The electronic device 1000 according to an embodiment may obtain a plurality of submodels, by dividing the artificial intelligence model 100 requested to be processed. The artificial intelligence model 100 according to an embodiment may be divided according to connection relationships between various operators. For example, the artificial intelligence model 100 may be divided into the plurality of submodels based on a portion of the artificial intelligence model 100 that may be simultaneously processed by a plurality of processing devices in parallel.

According to an embodiment, the portion processable in parallel may, for example, be identified, based on a branch point 101 of the artificial intelligence model 100, at which a single upper operator is connected to a plurality of lower operators, and a junction point 102 located below the branch point 101 and at which a plurality of upper operators are connected to a single lower operator. According to an embodiment, a plurality of portions which may be simultaneously processed in parallel may be identified, based on the branch point 101 and the junction point 102, and thus, a plurality of submodels each including the identified portions may be obtained.

For example, the artificial intelligence model 100 may be divided into submodels 110-2 and 120-1 including two portions that may be simultaneously processed in parallel, and submodels 110-1 and 110-3 including the remaining portions, based on the branch point 101 and the junction point 102.

According to an embodiment, the artificial intelligence model 100 may be divided, based on a portion that may be acceleratedly processed according to the hardware characteristics of a corresponding processing device. For example, among operators included in the artificial intelligence model 100, there may be an operator that may be acceleratedly processed according to the characteristics of hardware included in the corresponding processing device. In this case, the submodels may be obtained, to determine an optimal processing device for each operator, considering operators that may be acceleratedly processed according to the hardware characteristics.

The artificial intelligence model 100 is not limited thereto, and may be divided into a plurality of submodels according to various methods.

The electronic device 1000 according to an embodiment may determine at least one processing device by which the plurality of submodels 110-1, 110-2, 110-3, and 120-1 are to be processed. According to an embodiment, the electronic device 1000 may determine, from among the one or more identified processing devices 110, 120, and 130, the first processing device 110 and the second processing device 120 to be requested for processing of the plurality of submodels 110-1, 110-2, 110-3, and 120-1. The first processing device 110 and the second processing device 120 according to an embodiment may be determined to be appropriate for processing the submodels 110-1, 110-2, 110-3, and 120-1, respectively, from among the one or more processing devices 110, 120, and 130.

For example, it may be predicted that the first processing device 110 may process the three submodels 110-1, 110-2, and 110-3 most quickly and accurately, based on the capability information of each of the one or more processing devices 110, 120, and 130. Because the submodel 120-1 may be processed in parallel while the first processing device 110 processes the submodel 110-2, it may be predicted that the second processing device 120 may process the submodel 120-1 most quickly and accurately, from among the one or more processing devices 120 and 130 other than the first processing device 110.

However, the disclosure is not limited to the above-described processing speed or accuracy, and the first processing device 110 and the second processing device 120 according to an embodiment may be determined to be appropriate for processing the plurality of submodels 110-1, 110-2, 110-3, and 120-1, based on various criteria (e.g., whether the device is in an idle state, a user preference, a battery's state of charge, etc.).

Because the submodel 120-1 includes an operator that may be acceleratedly processed by the first processing device 110, a processing time required for the first processing device 110 to process the two submodels 110-2 and 120-1 may be predicted to be less than the higher one of a processing time required for the first processing device 110 to process the submodel 110-2 and a processing time required for the second processing device 120 to process the submodel 120-1.

However, the disclosure is not limited thereto, and it may be determined, for various reasons, that processing, by the first processing device 110, the submodel 120-1 together with the submodel 110-2, is more appropriate than processing, by the second processing device 120, the submodel 120-1.

In this case, the two submodels 110-2 and 120-1 processable in parallel may be processed by the first processing device 110.

However, according to an embodiment, in a case of predicting a processing time required for a single processing device to process the plurality of submodels 110-2 and 120-1 processable in parallel, the processing time may be predicted by further considering a switching time required in the processing of the submodels.

For example, there may be a case where two different hardware units are required to process the two submodels 110-2 and 120-1 (e.g., a CPU and a GPU), and the two hardware units are unable to operate simultaneously. In this case, the switching time for switching an operating hardware unit may be further spent such that one of the two submodels 110-2, 120-1 may be processed on one hardware unit, and then the remaining submodel may be processed by another hardware unit. Accordingly, a processing time required for a single processing device to process the plurality of submodels 110-2 and 120-1 processable in parallel may be predicted by further considering the switching time described above.

According to an embodiment, processing devices to process the plurality of submodels 110-2 and 120-1 may be determined according to an amount of computations of at least one of the plurality of submodels 110-2 or 120-1 that may be simultaneously processed in parallel. According to an embodiment, a processing device to process a submodel that requires the greatest amount of computations from among the plurality of submodels 110-2 and 120-1 may be first determined, and processing devices to process the remaining submodel may be determined based on the determined processing device.

For example, in a case where the amount of computations of the submodel 110-2 is greater than that of the submodel 120-1, the first processing device 110 may be first determined to be appropriate for processing the submodel 110-2. According to an embodiment, the first processing device 110 among the one or more processing devices 110, 120, and 130 may be predicted to be most appropriate for processing the submodel 110-2, and thus the first processing device 110 may be determined as a device to process the submodel 110-2.

According to an embodiment, based on a predicted time required for the first processing device 110 to process the submodel 110-2, a device to process the remaining submodel 120-1, from among the one or more processing devices 120 and 130 other than the first processing device 110 may be determined.

According to an embodiment, in a case where the processing of the submodel 120-1 is completed prior to completion of the processing of the submodel 110-2 that is still being processed in parallel, a processing result of the submodel 120-1 may not be used until the processing of the submodel 110-3 is completed.

Accordingly, in a case where processing times required for the processing devices 120 and 130 to process the submodel 120-1, respectively, have been predicted to be less than or equal to a processing time required for the processing device 110 to process the submodel 110-2, a device that is determined to be more appropriate from among the processing devices 120 and 130 may be determined as a processing device to process the submodel 120-1, based on criteria other than the processing time. For example, at least one processing device for which a length of a predicted processing time required to process the submodel 120-1 is less than a length of the processing time required for the processing device 110 to process the submodel 110-2 may be identified first. The processing device to process the submodel 120-1 may be determined from among the one or more identified devices, based on the criteria other than the predicted processing time.

According to an embodiment, the electronic device 1000 may determine whether the processing times required for the processing devices 120 and 130 to process the submodel 120-1 are predicted to be less than or equal to the processing time required for the first processing device 110 to process the submodel 110-2, and, based on the determination, the processing device to process the submodel 120-1 may be determined. For example, in a case where both a processing time required for the second processing device 120 to process the submodel 120-1 and a processing time required for the third processing device 130 to process the submodel 120-1 have been predicted to be less than or equal to the processing time required for the first processing device 110 to process the submodel 110-2, one of the second processing device 120 and the third processing device 130 may be determined as the device to process the submodel 120-1, based on the criteria other than the predicted processing time.

The above-described criteria may include a criterion other than the predicted processing time, for determining whether each processing device is appropriate for processing the submodel 120-1. For example, the above-described criteria may include a battery's state of charge of each processing device, a user preference, a processing accuracy, or the like. However, the above-described criteria according to an embodiment are not limited to the above-described examples, and may include various criteria other than the processing time, for determining whether each processing device is appropriate for processing the submodel 120-1, considering the situation of each processing device.

The electronic device 1000 according to an embodiment may transmit, to the first processing device 110 and the second processing device 120, requests to process the plurality of submodels 110-1, 110-2, 110-3, and 120-1, respectively, according to the determining of the processing devices to process the submodels. The first processing device 110 and the second processing device 120 according to an embodiment may process the plurality of submodels 110-1, 110-2, 110-3, and 120-1, respectively, according to the requests received from the electronic device 1000.

According to an embodiment, the second processing device 120 may process the submodel 120-1, based on the processing time required for the first processing device 110 to process the submodel 110-2 in parallel while the submodel 120-1 is processed. For example, the second processing device 120 may operate to complete the processing of the submodel 120-1 at an appropriate time before the first processing device 110 completes the processing of the submodel 110-2, according to a change in the situation of the second processing device 120.

For example, the time required for the second processing device 120 to process the submodel 120-1 may increase due to various reasons, for example, the second processing device 120 initializing a new process while processing the submodel 120-1.

However, the second processing device 120 may operate such that the submodel 120-1 is completely processed before a predicted time point at which the first processing device 110 completely processes the submodel 110-2, even in a case where an actual time spent by the second processing device processing the submodel 120-1 exceeds the predicted processing time required for the second processing device to process the submodel 120-1.

According to an embodiment, because the submodel 110-3 that requires, as its input, a result of the processing of the submodel 120-1 is not processed until the submodel 110-2 is completely processed by the first processing device 110, the submodel 120-1 does not need to be completely processed before the submodel 110-2 is completely processed. Accordingly, the second processing device 120 according to an embodiment may adjust the processing speed of the submodel 120-1, based on information about the predicted processing time required for the first processing device 110 to process the submodel 110-2.

According to an embodiment, upon the transmission of the request to process the submodel 120-1 to the second processing device 120, the electronic device 1000 may also transmit, to the second processing device 120, the information about the predicted processing time required for the first processing device 110 to process the submodel 110-2. However, the disclosure is not limited thereto, and the second processing device 120 may obtain the information about the predicted processing time required for the first processing device 110 to process the submodel 110-2, in various manners. For example, the second processing device 120 may obtain the information about the predicted processing time required for the first processing device 110 to process the submodel 110-2, by requesting the first processing device 110 to provide the information.

According to an embodiment, upon the transmission of the requests to process the plurality of submodels 110-1, 110-2, 110-3, and 120-1 to the first processing device 110 and the second processing device 120, the electronic device 1000 may also transmit the plurality of submodels 110-1, 110-2, 110-3, and 120-1 to the first processing device 110 and the second processing device 120. The electronic device 1000 may transmit identification information for identifying the plurality of submodels 110-1, 110-2, 110-3, and 120-1, to the first processing device 110 and the second processing device 120, rather than transmitting the plurality of submodels 110-1, 110-2, 110-3, and 120-1. According to an embodiment, the first processing device 110 and the second processing device 120 may obtain the plurality of submodels 110-1, 110-2, 110-3, and 120-1 from the outside, based on the identification information received from the electronic device 1000. However, the disclosure is not limited thereto, and the first processing device 110 and the second processing device 120 may obtain the plurality of submodels 110-1, 110-2, 110-3, and 120-1 that the electronic device 1000 has requested to process, in various manners.

According to an embodiment, the submodel 110-1 from among the plurality of submodels 110-1, 110-2, 110-3, and 120-1 may be first processed by the first processing device 110. A result of the processing of the submodel 110-1 may be used for the remaining two submodels 110-2 and 120-1 to be processed by the first processing device 110 and the second processing device 120.

According to an embodiment, the result of the processing of the submodel 110-1 may be transmitted to the second processing device 120, and thus, the submodel 120-1 may be processed by the second processing device 120. The result of the processing of the submodel 110-1 may be directly transmitted from the first processing device 110 to the second processing device 120, or may be transmitted from the first processing device 110 to the second processing device 120 through the electronic device 1000.

Results of the processing of the two submodels 110-2 and 120-1 may be used for the next submodel 110-3 to be processed by the first processing device 110. Similarly, the result of the processing of the submodel 120-1, which is performed by the second processing device 120, from among the results of the processing of the two submodels 110-2 and 120-1, may be directly transmitted from the second processing device 120 to the first processing device 110, or may be transmitted from the second processing device 120 to the first processing device 110 through the electronic device 1000.

However, the disclosure is not limited thereto, and the results of the processing the submodels 110-1, 110-2, and 120-1 may be transmitted to a processing device to process a next submodel, in various manners.

A result of the processing of the submodel 110-3 may be finally transmitted to the electronic device 1000, and may be used to perform various operations based on the artificial intelligence model 100.

According to an embodiment, a guard time with respect to the time spent processing each of the submodels 110-1, 110-2, 110-3, and 120-1 may be set in advance. According to an embodiment, the guard time may be determined based on the predicted processing times required for the first processing device 110 and the second processing device 120 to process the corresponding submodels 110-1, 110-2, 110-3, and 120-1. For example, the guard time may be set to be a time obtained by adding a preset constant value to the predicted processing time. However, the disclosure is not limited thereto, and the guard time may be determined, for example, to be greater than or equal to the predicted processing time, in various manners.

According to an embodiment, the guard time may be set in advance to prepare for a case where an actual time being spent by the first processing device 110 or the second processing device 120 processing the corresponding submodel exceeds the predicted processing time required for the first processing device 110 or the second processing device 120 to process the submodel. For example, in a case where the first processing device 110 or the second processing device 120 processing the corresponding submodel initializes a new operation according to a user's request, resources (e.g., the current capacity of a memory or a battery, a hardware occupancy, etc.) for processing the submodel may become insufficient to process the submodel, and accordingly, the actual time spent processing the submodel may exceed the predicted processing time, or the processing device may become unable to perform the processing.

According to an embodiment, the electronic device 1000 may determine information about the guard times for the respective submodels 110-1, 110-2, 110-3, and 120-1. In addition, in a case where each processing device receives the result of the processing of the corresponding submodel directly from another processing device, the electronic device 1000 may transmit, to the processing devices 110 and 120, the information about the guard times for the respective submodels, for which the result of the processing is to be received.

For example, in a case where the first processing device 110 receives the result of the processing of the submodel 120-1 directly from the second processing device 120, the first processing device 110 may obtain the information about the guard time for the submodel 120-1. In addition, in a case where the second processing device 120 receives the result of the processing of the submodel 110-1 directly from the first processing device 110, the second processing device 120 may obtain the information about the guard time for the submodel 110-1.

In a case where each of the processing devices 110 and 120 receives the result of the processing of the corresponding submodel through the electronic device 1000, because the electronic device 1000 may receive all of the results of the processing of the submodels, the electronic device 1000 may not transmit the information about the guard times to the processing devices 110 and 120.

According to an embodiment, in a case where the result of the processing of the corresponding submodel is not received until a time point determined based on the preset guard time, the electronic device 1000 or each of the processing devices 110 and 120 may transmit, to another processing device, a request to process the corresponding submodel.

For example, there may be a case where the result of the processing of the submodel 110-1 may not be transmitted from the first processing device 110 to the electronic device 1000 or the second processing device 120, until a time point determined based on the preset guard time. In this case, the electronic device 1000 may transmit a request to process the submodel 110-1 to the second processing device 120 or the third processing device 130. The electronic device 1000 may directly process the submodel 110-1. According to an embodiment, the submodel 100-1 may be processed by any one selected from the electronic device 1000, the second processing device 120, and the third processing device 130, which is determined to be appropriate for processing the submodel 110-1 based on various criteria (e.g., the predicted processing time, the battery's state of charge, the number of processes that may be processed by a CPU or a GPU, etc.).

According to an embodiment, the guard time may be set based on the predicted processing time required to process another submodel that is to be processed in parallel. For example, the guard time for the submodel 120-1 may be set considering that the second processing device 120 may operate to completely process the submodel 120-1 at an appropriate time point prior to the completion of the processing of the submodel 110-2 by the first processing device 110, according to a change in the situation of the second processing device 120. For example, the guard time for the submodel 120-1 may be determined to be a value obtained by adding a preset constant value to the predicted processing time required for the first processing device 110 to process the submodel 110-2.

The electronic device 1000 according to an embodiment may continuously transmit a polling message to the first processing device 110 or the second processing device 120 that is processing the corresponding submodel, to determine whether the submodel may be completely processed before the predicted time point of the completion of the processing, or a preset time point. The electronic device 1000 according to an embodiment may receive a response to the polling message received from each of the processing devices 110 and 120, to determine that the submodel may not be completely processed before the predicted time point of the completion of the processing, or a preset time point. In this case, the electronic device 1000 may transmit a request to process the submodel 110-1, to any one of the second processing device 120 and the third processing device 130, which is determined to be appropriate for processing the submodel 110-1, according to various criteria (e.g., the predicted processing time, the battery's state of charge, the number of processes that may be processed by a CPU or a GPU, etc.).

According to an embodiment, the electronic device 1000 may transmit requests to process a single submodel, to a plurality of processing devices, to prepare for a case where the submodel is not completely processed by a processing device that has been determined to process the submodel, before a predicted time point of completion of the processing. For example, the request to process the submodel 120-1 may be transmitted to the third processing device 130 as well as the second processing device 120. Accordingly, according to an embodiment, the distributed processing of the artificial intelligence model 100 may be stably performed.

Figure 2:
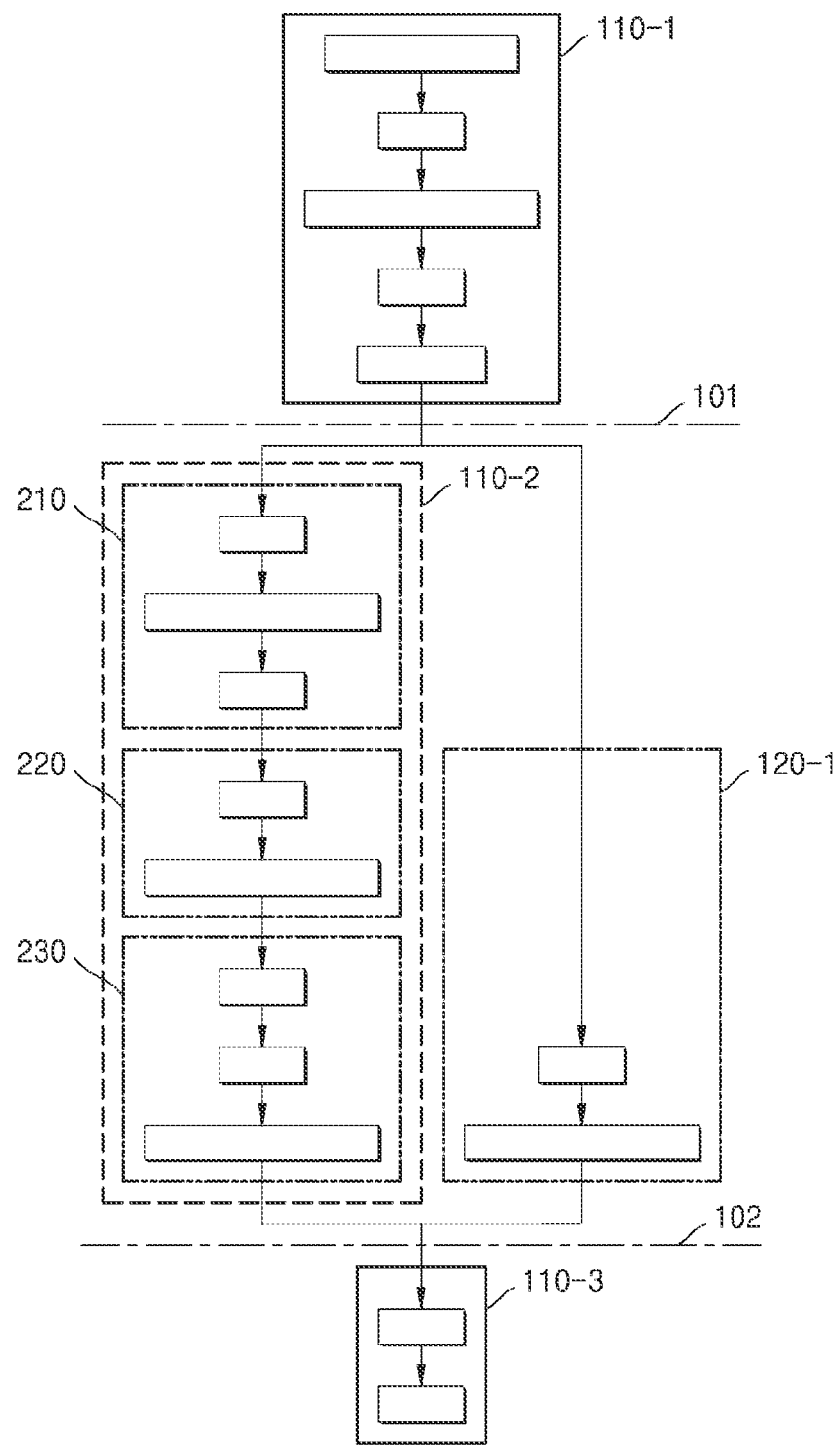
FIG. 2 is a diagram illustrating an example in which an artificial intelligence model is divided, according to various embodiments.

FIG. 2 is a diagram illustrating an example in which the artificial intelligence model 100 is divided, according to various embodiments.

Referring to FIG. 2, the artificial intelligence model 100 may be divided into a plurality of submodels based on a branch point 101 and a junction point 102. For example, the artificial intelligence model 100 may be divided into a submodel 110-1 above the branch point 101, submodels 110-2 and 120-1 between the branch point 101 and the junction point 102, and a submodel 110-3 below the junction point 102.

According to an embodiment, a plurality of operators that may be simultaneously processed in parallel may be below the branch point 101, and results of the operators that are processed in parallel may be provided to one operator below the junction point 102. Accordingly, according to an embodiment, the artificial intelligence model 100 may be divided based on the branch point 101 and the junction point 102, according to whether the artificial intelligence model 100 includes operators processable in parallel.

However, the disclosure is not limited thereto, and the artificial intelligence model 100 may be divided according to various methods and criteria.

According to an embodiment, the submodel 110-2 from among the plurality of submodels may include at least one operator that may be acceleratedly processed according to the hardware characteristics of a corresponding processing device. According to an embodiment, the submodel 110-2 may be further divided into a plurality of submodels 210, 220, and 230 based on the at least one operator that may be acceleratedly processed For example, the speeds at which a CPU and a GPU respectively process each of operators included in the submodels 210 and 230 may be substantially similar to each other, whereas the speed at which a GPU processes each of operators included in the submodel 220 may be significantly higher than the speed at which a CPU processes each of the operators included in the submodel 220.

According to an embodiment, the submodel 110-2 may be divided into the plurality of submodels 210, 220, and 230 such that a processing device appropriate for each operator may be determined based on characteristics of the operators included in the submodels 210, 220 and 230, respectively.

According to an embodiment, the plurality of submodels 210, 220, and 230 may be individually determined to be processed by the first processing device 110 or the second processing device 120. For example, the first processing device 110 may be equipped with a CPU but may not be equipped with a GPU. In addition, the second processing device 120 may be equipped with a CPU and a GPU, but may have a low processing speed due to other circumstances (e.g., another process being performed, a low level of charge of the battery, etc.). Accordingly, the first processing device 110 may be determined to process the submodels 210 and 230, and the second processing device 120 may be determined to process the submodel 220.

However, the processing devices to process the submodels may be determined, further considering a time required for a result of the processing of the submodel 210 to be transmitted to the first processing device 110, and a time required for a result of the processing of the submodel 220 to be transmitted to the second processing device 120.

For example, a predicted time point at which the results of the processing, by the first processing device 110 and the second processing device 120, of the submodels 210, 220, and 230 are finally obtained, considering times required for the results of the processing of the submodels 210 and 220 to be transmitted to the corresponding processing devices, may be subsequent to a predicted time point at which results of processing, by the first processing device 110, of the submodels 210, 220, and 230 are finally obtained. In this case, the first processing device 110 may be determined to process the plurality of submodels 210, 220, and 230.

However, the disclosure is not limited thereto, and the processing device to process each of the submodels 210, 220, and 230 may be determined according to various methods and criteria.

Figure 3:
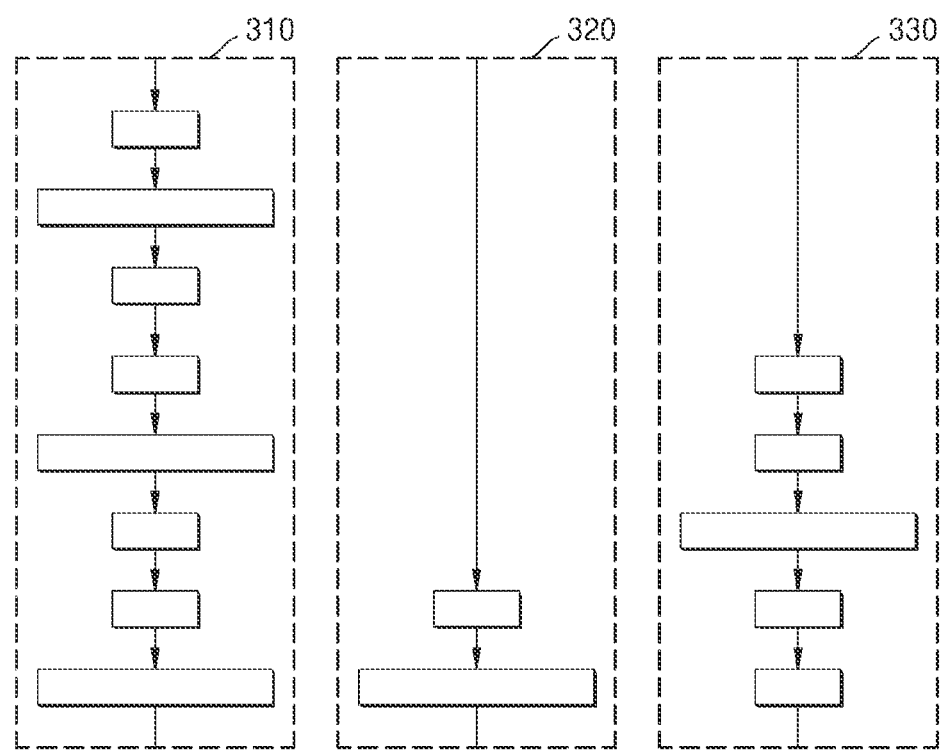
FIG. 3 is a diagram illustrating an example method of determining a processing device to process each submodel, according to various embodiments.

FIG. 3 is a diagram illustrating an example method of determining a processing device to process each of a plurality of submodels 310, 320, and 330, according to various embodiments.

Referring to FIG. 3, an artificial intelligence model according to an embodiment may be divided into the plurality of submodels 310, 320, and 330 that may be simultaneously processed in parallel. According to an embodiment, a processing device to process each of the submodels 310, 320, and 330 may be determined from among at least one processing device.

According to an embodiment, each of the submodels 310, 320, and 330 may include an operator that may be processed by a certain type of hardware (e.g., a CPU, a GPU, a neural processing unit (NPU), etc.). For example, the submodels 310 and 330 may be processed by a CPU, while the submodel 320 may be processed by a GPU.

Accordingly, according to an embodiment, in a case where a plurality of submodels are processed by different hardware units (e.g., a CPU and a GPU) included in a single processing device, a switching time may be further required for switching between the hardware units.

For example, a predicted processing time required for the first processing device 110 to process the submodels 310 and 320 may be determined to be a value obtained by adding a time required for the submodels 310 and 320 to be sequentially processed by the CPU and the GPU, respectively, to a time required for the CPU to be switched with the GPU.

On the other hand, in a case where the submodels 310 and 320 are processed by different processing devices, respectively, thus without a hardware switching operation, the switching time may not be considered for the predicted processing time. For example, in a case where the submodel 310 is processed by a CPU of the first processing device 110 and the submodel 320 is processed by a GPU of the second processing device 120, each processing device does not perform any hardware switching operation, and thus, a switching time may not be considered.

According to an embodiment, a device to process each submodel may be determined based on the processing time required for each processing device to process each submodel that is predicted considering a switching time.

Figure 4:
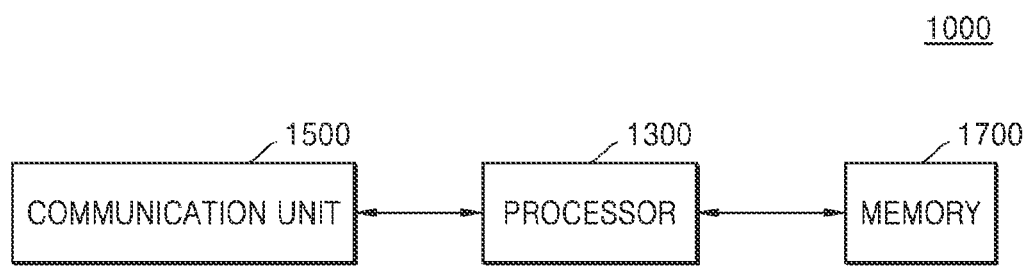
FIG. 4 is a block diagram illustrating an example configuration of an electronic device, according to various embodiments.

FIG. 4 is a block diagram illustrating an example configuration of the electronic device 1000, according to various embodiments.

Figure 5:
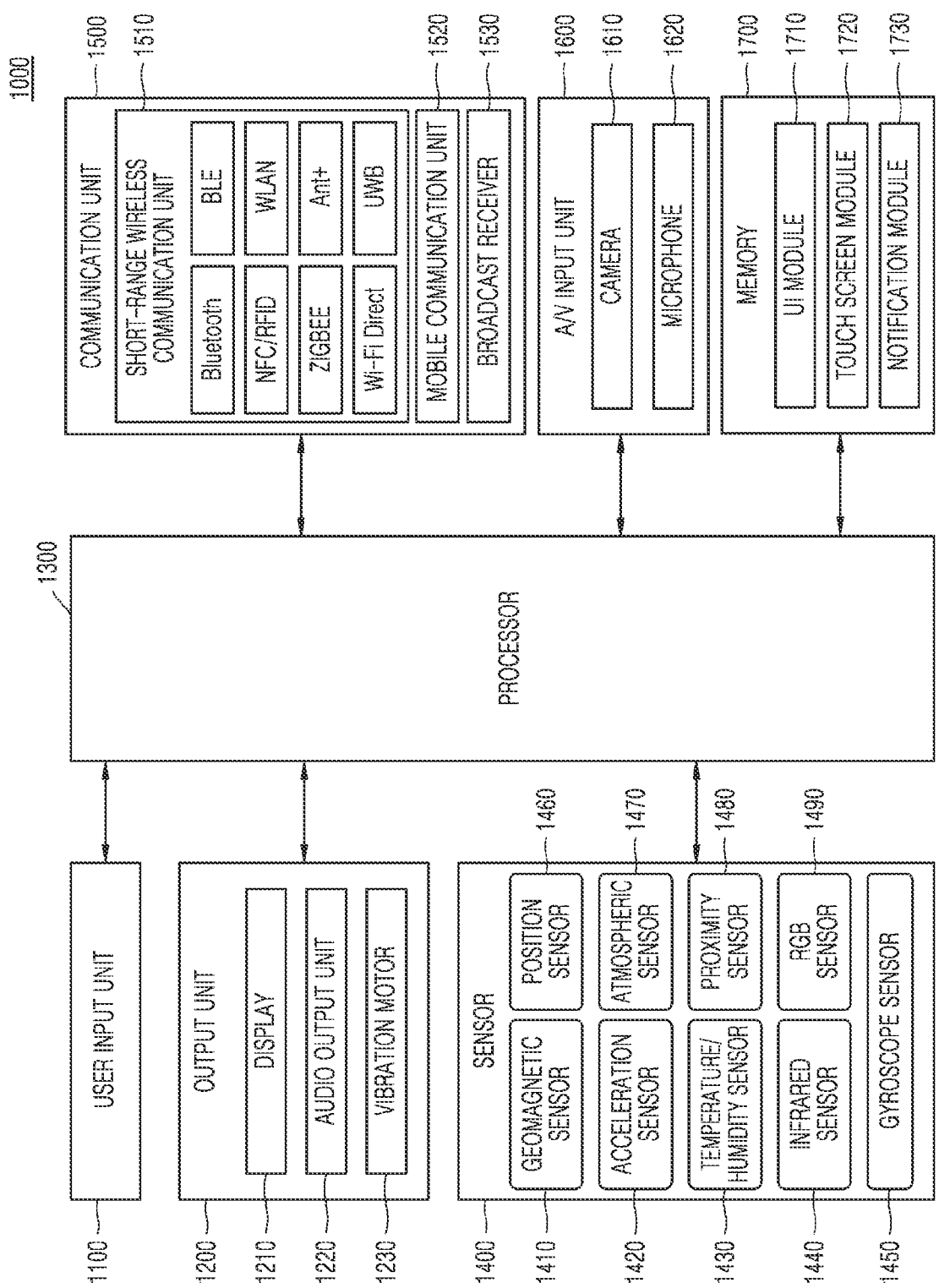
FIG. 5 is a block diagram illustrating an example configuration of an electronic device, according to various embodiments.

FIG. 5 is a block diagram illustrating an example configuration of the electronic device 1000, according to various embodiments.

Referring to FIG. 4, the electronic device 1000 may include a processor (e.g., including processing circuitry) 1300, a communication unit (e.g., including communication circuitry) 1500, and a memory 1700. However, all components shown in FIG. 4 are not essential components of the electronic device 1000. The electronic device 1000 may be implemented by more components than the components shown in FIG. 4, or by fewer components than the components shown in FIG. 4.

For example, as shown in FIG. 5, the electronic device 1000 according to an embodiment may further include a user input unit (e.g., including user input circuitry) 1100, an output unit (e.g., including output circuitry) 1200, a sensor 1400, and an audio/video (A/V) input unit (e.g., including audio/video input circuitry) 1600, in addition to the processor 1300, the communication unit 1500, and the memory 1700.

The user input unit 1100 may include various user input circuitry via which a user inputs data for controlling the electronic device 1000. For example, the user input unit 1100 may include, but is not limited to, a key pad, a dome switch, a touch pad (e.g., a touch-type capacitive touch pad, a pressure-type resistive overlay touch pad, an infrared sensor-type touch pad, a surface acoustic wave conduction touch pad, an integration-type tension measurement touch pad, a piezoelectric effect-type touch pad), a jog wheel, a jog switch, etc.

According to an embodiment, the user input unit 1100 may receive a user input for processing the artificial intelligence model 100.

An output unit 1200 may include various output circuitry and output an audio signal, a video signal, or a vibration signal, and the output unit 1200 may include a display 1210, an audio output unit (e.g., including audio output circuitry) 1220, and a vibration motor 1230.

The display 1210 may display information processed by the electronic device 1000. According to an embodiment, the display 1210 may display and output information related to a result of processing the artificial intelligence model 100.

In a case where the display 1210 and a touchpad form a layer structure and thus includes a touch screen, the display 1210 may also be used as an input device in addition to being used as an output device. The display 1210 may include at least one of a liquid crystal display, a thin film transistor-liquid crystal display, an organic light-emitting diode display, a flexible display, a three-dimensional (3D) display, or an electrophoretic display. The electronic device 1000 may include two or more displays 1210 according to an implementation of the electronic device 1000.

The audio output unit 1220 may include various audio output circuitry and output audio data received from the communication unit 1500 or stored in the memory 1700.

The vibration motor 1230 may output a vibration signal. The vibration motor 1230 may also output a vibration signal when the touch screen is touched. According to an embodiment, the audio output unit 1220 and the vibration motor 1230 may output the information related to the result of processing the artificial intelligence model 100.

The processor 1300 may include various processing circuitry and control the overall operation of the electronic device 1000. For example, the processor 1300 may generally control the user input unit 1100, the output unit 1200, the sensor 1400, the communication unit 1500, the A/V input unit 1600, and the like, by executing programs stored in the memory 1700.

The electronic device 1000 may include at least one processor 1300. For example, the electronic device 1000 may include various types of processors such as, for example, and without limitation, a CPU, a GPU, an NPU, or the like.

The processor 1300 may be configured to process commands of a computer program by performing basic arithmetic, logic, and input/output operations. The commands may be provided from the memory 1700 to the processor 1300, or may be received through the communication unit 1500 and provided to the processor 1300. For example, the processor 1300 may be configured to execute the commands according to program code stored in a storage device such as a memory.

The processor 1300 according to an embodiment may divide an artificial intelligence model to obtain a plurality of submodels processable in parallel, and determine a first processing device to process a first submodel that requires a greatest amount of computations among the plurality of submodels. The processor 1300 may also predict a first processing time required for the first processing device to process the first submodel, and may determine the second processing device to process the second submodel from among the plurality of submodels, based on the predicted first processing time.

The processor 1300 according to an embodiment may identify at least one device for which a second predicted processing time required to process the second submodel is less than or equal to a predicted first processing time required for the first processing device to process the first submodel, and determine the second processing device to process the second submodel, from among the at least one identified device. According to an embodiment, the processor 1300 may determine the second processing device to process the second submodel from among the at least one identified device based on at least one criterion other than a predicted second processing time required for each device to process the second submodel.

The at least one criterion according to an embodiment may include a criterion for determining whether each processing device is appropriate for processing the second submodel, considering a situation in which each processing device processes the second submodel.

According to an embodiment, even in a case where a result of the processing of the second submodel is output before a result of the processing of the first submodel is output, the result of the processing of the second submodel may be not used for processing a next submodel until the result of the processing of the first submodel is output. Accordingly, the second submodel does not need to be rapidly processed, and thus, the second processing device may be determined based on at least one criterion other than the processing time.

According to an embodiment, the second processing device does not need to process the second submodel faster than the processing of the first submodel. Accordingly, the second processing device may completely process the second submodel before the processing of the first submodel is completed, by appropriately adjusting the speed at which the second submodel is processed, considering the state of the second processing device, using information about the predicted first processing time required for the first processing device to process the first submodel.

According to an embodiment, the information about the predicted first processing time required for the first processing device to process the first submodel may be transmitted from the electronic device 1000 to the second processing device, but is not limited thereto, and may be generated by the first processing device and transmitted to the second processing device. According to an embodiment, the information about the predicted first processing time required for the first processing device to process the first submodel may be changed in real time according to the state of the first processing device. Accordingly, the second processing device may obtain the information about the predicted first processing time required for the first processing device to process the first submodel, that is being changed in real time, to process the second submodel at an appropriate speed accordingly.

A sensor 1400 may detect the state of the electronic device 1000 or the state of the periphery of the electronic device 1000, and may transmit the detected information to the processor 1300.

The sensor 1400 may include various sensors, such as, for example, and without limitation, at least one of a geomagnetic sensor 1410, an acceleration sensor 1420, a temperature/humidity sensor 1430, an infrared sensor 1440, a gyroscope sensor 1450, a position sensor 1460 (e.g., a GPS), an atmospheric pressure sensor 1470, a proximity sensor 1480, and/or an RGB sensor 1490 (illuminance sensor), but is not limited thereto.

The communication unit 1500 may include various communication circuitry included in one or more components via which the electronic device 1000 communicates with a server (not shown) or an external device (not shown). For example, the communication unit 1500 may include a short-range wireless communication unit 1510, a mobile communication unit 1520, and a broadcast receiver 1530.

The short-range wireless communication unit 1510 may include, but is not limited to, a Bluetooth communication unit, a Bluetooth Low Energy (BLE) communication unit, a near field communication (NFC) unit, a WLAN (Wi-Fi) communication unit, a Zigbee communication unit, an Infrared Data Association (IrDA) communication unit, a Wi-Fi Direct (WFD) communication unit, an ultra wideband (UWB) communication unit, an Ant+ communication unit, or the like.

The mobile communication unit 1520 may transmit and receive a wireless signal to and from at least one of a base station, an external terminal, or a server on a mobile communication network. Here, the wireless signals may include various types of data based on transmission and reception of voice call signals, video call signals, or text/multimedia messages.

The broadcast receiver 1530 may receive a broadcast signal and/or broadcast-related information from the outside through a broadcast channel. The broadcast channels may include satellite channels and terrestrial channels. According to an embodiment, the electronic device 1000 may not include the broadcast receiver 1530.

According to an embodiment, the communication unit 1500 may receive, from the outside, a request to process an artificial intelligence model to be distributed and processed. The communication unit 1500 may transmit, to the first processing device and the second processing device, information for requesting to process the first submodel and the second submodel. However, the disclosure is not limited thereto, and the communication unit 1500 may transmit and receive information necessary for the distributed processing of the artificial intelligence model.

The A/V input unit 1600 may include various A/V input circuitry via which an audio signal or a video signal may be input, and may include a camera 1610, a microphone 1620, and the like. The camera 1610 may operate in a video call mode or a photographing mode to obtain an image frame such as a still image or a moving image using an image sensor. An image captured by the image sensor may be processed by the processor 1300 or a separate image processor (not shown).

The microphone 1620 may receive an external audio signal, and process the received audio signal into electrical voice data.

The A/V input unit 1600 according to an embodiment may obtain data required for the distributed processing of the artificial intelligence model. For example, the A/V input unit 1600 may receive a user's gesture or voice input for performing the distributed processing of the artificial intelligence model. However, the disclosure is not limited thereto, and the A/V input unit 1600 may obtain various types of data required for the distributed processing of the artificial intelligence model.

The memory 1700 may store a program for processing and controlling the processor 1300, and may store data input to or output from the electronic device 1000.

The memory 1700 according to an embodiment may store various pieces of data required for the distributed processing of the artificial intelligence model. For example, the memory 1700 may store information about the artificial intelligence model that may be distributed and processed.

The memory 1700 may include at least one of flash memory, a hard disk, a multimedia card micro, a card-type memory (e.g., SD or XD memory), random access memory (RAM), static random access memory (SRAM), read-only memory (ROM), electrically erasable programmable read-only memory (EEPROM), programmable read-only memory (PROM), magnetic memory, a magnetic disc, an optical disc, or the like.

Programs stored in the memory 1700 may be classified into a plurality of modules according to their functions, for example, into a user interface (UI) module 1710, a touch screen module 1720, and a notification module 1730.

The UI module 1710 may provide a specialized user interface or graphical user interface, or the like that works with the electronic device 1000, for each application. The touch screen module 1720 may detect a touch gesture input on a touch screen by a user, and may transmit information about the touch gesture to the processor 1300. The touch screen module 1720 according to some embodiments may recognize and analyze a touch coordinate code. The touch screen module 1720 may be configured as separate hardware including a controller.

In order to detect a touch or a proximity touch on the touch screen, various sensors may be provided inside or near the touch screen. An example of the sensors for detecting a touch on the touch screen may include a tactile sensor. The tactile sensor detects a contact of a particular object to a degree greater than or equal to the degree to which a human detects a touch. The tactile sensor may detect various pieces of information including the roughness of a contact surface, the rigidity of a contact object, or the temperature of a contact point.

A user's touch gesture may include tap, touch and hold, double-tap, drag, panning, flick, drag and drop, swipe, or the like.

The notification module 1730 may generate a signal for notifying of the occurrence of an event in the electronic device 1000.

Figure 6:
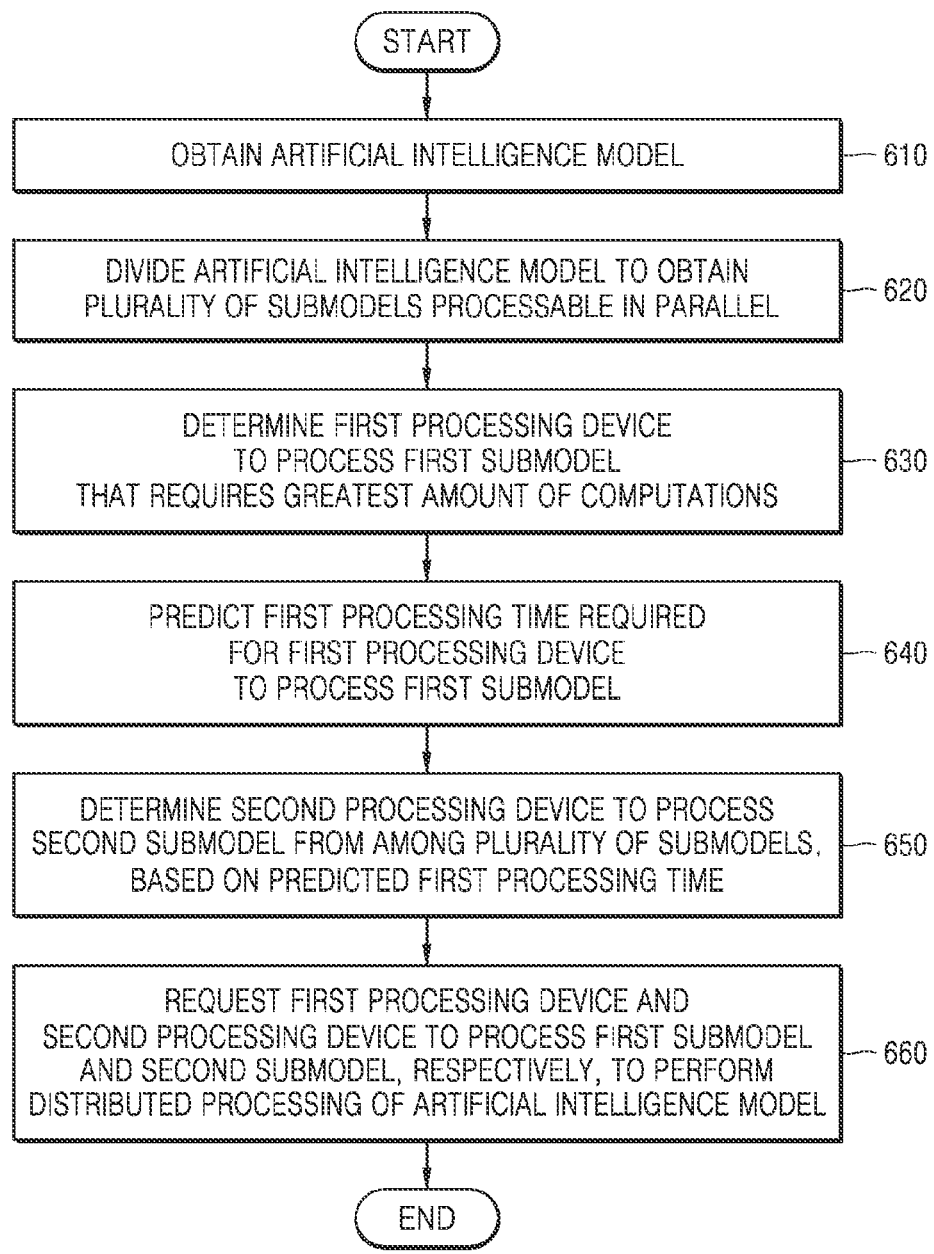
FIG. 6 is a flowchart illustrating an example method, performed by an electronic device, of performing distributed processing of an artificial intelligence model, according to various embodiments.

FIG. 6 is a flowchart illustrating an example method by which the electronic device 1000 performs distributed processing of an artificial intelligence model, according various embodiments.

Referring to FIG. 6, in operation 610, the electronic device 1000 may obtain an artificial intelligence model to be distributed and processed. The electronic device 1000 according to an embodiment may perform distributed processing of the artificial intelligence model, in response to receipt of a request to process the artificial intelligence model from the outside. However, the disclosure is not limited thereto, and the distributed processing of the artificial intelligence model may be performed according to an internal operation of the electronic device 1000 without an external request.

According to an embodiment, the artificial intelligence model may be received from an external device (not shown) transmitting a request to process the artificial intelligence model. The artificial intelligence model may be received from another device based on identification information of the artificial intelligence model received from the external device (not shown) transmitting the request. However, the disclosure is not limited thereto, and the electronic device 1000 may obtain the artificial intelligence model to be distributed and processed, in various manners.

In operation 620, the electronic device 1000 according to an embodiment may obtain a plurality of submodels processable in parallel, by dividing the artificial intelligence model. According to an embodiment, the plurality of submodels processable in parallel may be identified based on a branch point and a junction point. For example, the plurality of submodels may receive the same one branch point as their inputs, and their outputs may include the same one junction point.

However, the disclosure is not limited thereto, and the plurality of submodels may be obtained in various manners.

According to an embodiment, the artificial intelligence model may include an operator that may be acceleratedly processed according to the hardware characteristics of a corresponding processing device. According to an embodiment, each of the plurality of submodels obtained by dividing the artificial intelligence model may include at least one submodel including an operator that may be acceleratedly processed according to the hardware characteristics of the corresponding processing device. Accordingly, the artificial intelligence model may be further divided such that an appropriate processing device may be determined for each operator.

In operation 630, the electronic device 1000 according to an embodiment may determine a first processing device to process a first submodel that requires the greatest amount of computations among the plurality of submodels.

The first submodel according to an embodiment may receive the branch point as its input, and its output may include the junction point. The first submodel according to an embodiment may be determined to have the greatest amount of computations from among the submodels between the branch point and the junction point of the artificial intelligence model.

The first submodel according to an embodiment may include a plurality of serial submodels. For example, the artificial intelligence model may be divided into a plurality of submodels arranged along a plurality of lines between the branch point and the junction point, at least one operator that may be acceleratedly processed may be arranged on any one of the plurality of lines, and accordingly, a plurality of serial submodels including the at least one operator on the corresponding line, may be identified. In this case, the first submodel may include the plurality of serial submodels identified on the corresponding line.

In operation 640, the electronic device 1000 according to an embodiment may predict a first processing time required for the first processing device to process the first submodel. According to an embodiment, the first submodel including the plurality of serial submodels may be processed by at least one first processing device. In this case, in operation 640, a first processing time required for the at least one first processing device to process the first submodel may be predicted by the at least one first processing device, respectively.

The first processing time may be determined according to whether the first submodel is to be processed by a plurality of hardware units. For example, in a case where the first submodel is predicted to be processed by a plurality of hardware units, a switching time for hardware switching may be further spent. In a case where the first submodel is to be divided in series and processed by a plurality of first processing devices, a time required for results of the processing to be transmitted between the processing devices may be further spent. Accordingly, the first processing time required to process the first submodel may be predicted by further considering at least one of the switching time or the time required for the results of the processing to be transmitted between the processing devices.

In operation 650, the electronic device 1000 may determine a second processing device to process a second submodel from among the plurality of submodels, based on the first processing time predicted in operation 640.

According to an embodiment, the second processing device may be determined based on the predicted first processing time required to process the first submodel. According to an embodiment, at least one device for which a predicted second processing time required to process the second submodel is less than or equal to the predicted first processing time required to process the first submodel, may be identified.

A second processing time required for each processing device to process the second submodel may be predicted according to whether the second submodel is to be processed by a plurality of hardware units. For example, in a case where the second submodel is predicted to be processed by a plurality of hardware units included in each processing device, a switching time may be further required for switching between the hardware units. Accordingly, the second processing time required for each processing device to process the second submodel may be predicted by further considering the switching time.

In addition, in a case where the second submodel is further divided in series and processed by a plurality of second processing devices, a time required for results of the processing to be transmitted between the processing devices may be further required. Accordingly, the second processing time required to process the second submodel may be predicted by further considering at least one of the switching time or the time required for the results of the processing to be transmitted between the processing devices.

According to an embodiment, based on at least one criterion other than the predicted second processing time required for each processing device to process the second submodel, the electronic device 1000 may determine the second processing device to process the second submodel, from among the at least one device for which the predicted second processing time required to process the second submodel is less than or equal to the first processing time, predicted in operation 640, required to process the first submodel.

According to an embodiment, the at least one criterion may include a criterion for determining whether each processing device is appropriate for processing the second submodel, considering a situation in which each processing device processes the second submodel. For example, the second processing device may be determined based on various criteria, such as information about the state of each processing device, or information about resources used to process the second submodel.

In operation 660, the electronic device 1000 according to an embodiment may request the first processing device determined in operation 630 and the second processing device determined in operation 650, to process the first submodel and the second submodel, respectively, and thus may perform the distributed processing of the artificial intelligence model.

According to an embodiment, the second processing device may process the second submodel based on information obtained by predicting the first processing time required for the first processing device to process the first submodel. For example, the second processing device may adjust the processing speed of the second submodel based on a current state of the second processing device, such that the second submodel may be completely processed within the predicted first processing time required to process the first submodel. For example, in a case where the second processing device initializes a new process, and accordingly, the amount of resources of the second processing device that may be used to process the second submodel is reduced, the second processing device may adjust the processing speed of the second submodel to be lower in accordance with the reduced amount of the resources.

According to an embodiment, even in a case where the second submodel is completely processed before the first submodel is completely processed, a result of the processing of the second submodel may be on standby without being used, until a result of the processing of the first submodel is output. According to an embodiment, the results of the processing of the first submodel and the second submodel may be processed together by an operator below the junction point, and accordingly, any one of the results that has been output first may not be used immediately. Accordingly, the second processing device may process the submodel within the predicted first processing time required to process the first submodel, by appropriately adjusting the processing speed of the second submodel, considering a situation of the second processing device, rather than rapidly processing the second submodel.

Figure 7:
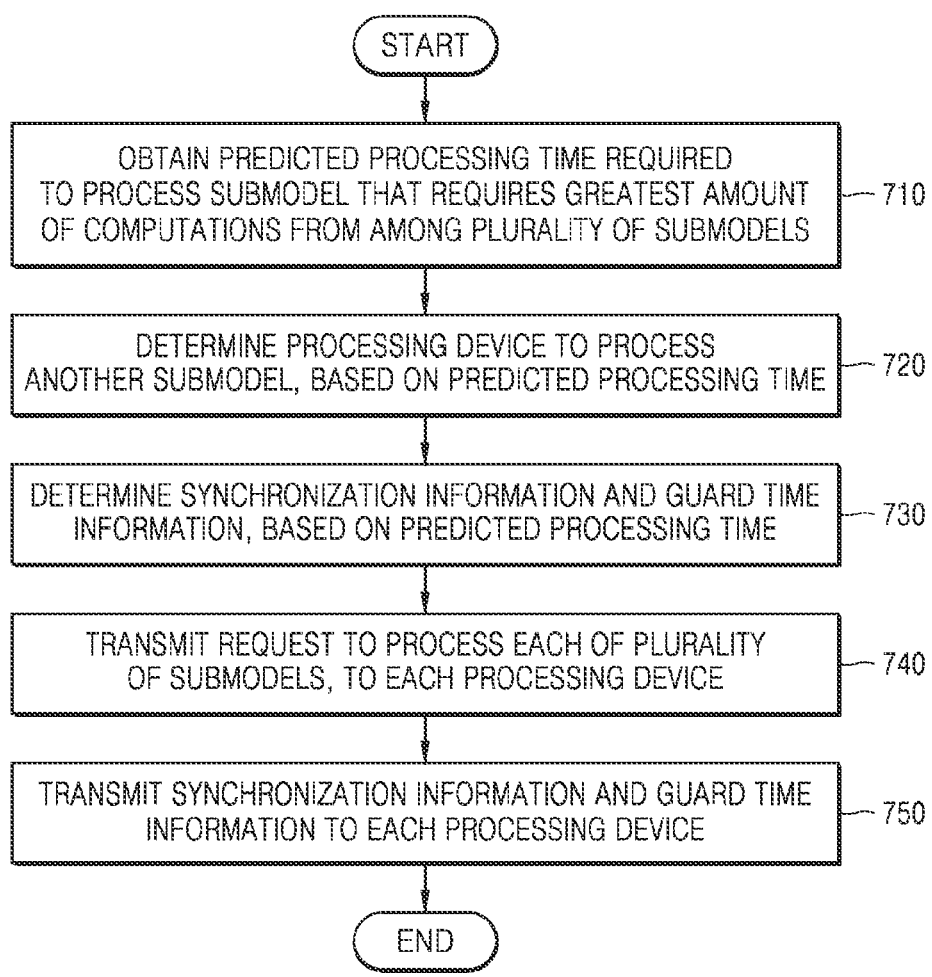
FIG. 7 is a flowchart illustrating an example method of transmitting requests to process a plurality of submodels, according to various embodiments.

FIG. 7 is a flowchart illustrating an example method of transmitting requests to process a plurality of submodels, according to an embodiment.

Referring to FIG. 7, in operation 710, the electronic device 1000 according to an embodiment may obtain a predicted processing time required to process a submodel that requires the greatest amount of computations from among a plurality of submodels into which an artificial intelligence model has been divided. Here, the submodel that requires the greatest amount of computations of operation 710 may include submodels that may be processed together in parallel, may receive a branch point as its input, and its output may be a junction point. However, the disclosure is not limited thereto, and the submodel that requires the greatest amount of computations of operation 710 may have various characteristics.

In operation 720, the electronic device 1000 according to an embodiment may determine a processing device to process another submodel, based on the predicted processing time obtained in operation 710. According to an embodiment, the another submodel may be a submodel which may be processed in parallel together with the submodel that requires the greatest amount of computations of operation 710, and which receives the branch point as its input, and an output of which is the junction point.

According to an embodiment, the processing device to process the another submodel may be determined, according to whether the processing device is able to completely process the another submodel within the predicted processing time obtained in operation 710.

In operation 730, the electronic device 1000 may determine synchronization information and guard time information, based on the predicted processing time obtained in operation 710.

According to an embodiment, the synchronization information may be used to completely process the another submodel within the predicted processing time obtained in operation 710. For example, the processing device to process the another submodel may operate based on the synchronization information, such that the another submodel may be completely processed prior to or at a time point at which the submodel that requires the greatest amount of computations of operation 710 is to be completely processed.

According to an embodiment, the guard time information may be used as a criterion for determining whether each submodel is to be completely processed significantly later than a predicted processing time required to process each submodel, due to a change in the situation of the processing device processing each submodel.

For example, the guard time information of the submodel that requires the greatest amount of computations of operation 710 and the another submodel of operation 720 may include a value obtained by adding a preset constant value to the predicted processing time obtained in operation 710. According to an embodiment, the another submodel of operation 720 may be completely processed prior to or at the time point at which the submodel that requires the greatest amount of computations of operation 710 is to be completely processed, and thus the guard time information of the another submodel may be determined to be the same as the guard time information of the submodel that requires the greatest amount of computations of operation 710.

According to an embodiment, the predicted processing time obtained in operation 710 may be changed in real time according to a change in the situation of the processing device to process the submodel that requires the greatest amount of computations of operation 710. According to an embodiment, the synchronization information and the guard time information may be changed in real time as the electronic device 1000 obtains information about the predicted processing time of operation 710, which may be changed in real time.

In operation 740, the electronic device 1000 according to an embodiment may transmit a request to process each of the plurality of submodels, to each processing device.

In operation 750, the electronic device 1000 according to an embodiment may transmit the synchronization information and the guard time information determined in operation 730 to each processing device.

According to an embodiment, the guard time information of each submodel may be transmitted to each processing device to process each submodel. According to an embodiment, in a case where the processing device that is processing the submodel has determined, based on the guard time information, that the submodel may be completely processed significantly later than a predicted time point, the processing device may request the electronic device 1000 to allow the submodel to be processed by another processing device. However, the disclosure is not limited thereto, and the guard time information may be transmitted to another processing device that uses a result of the processing of each submodel. The guard time information according to an embodiment may be transmitted to various processing devices and used in various manners such that the submodel may be rapidly processed by another processing device.

According to an embodiment, the guard time information of each submodel may be used by the electronic device 1000 without being transmitted to other processing devices. For example, the electronic device 1000 may identify a submodel of which a result of the processing is not output until a preset time point, based on the guard time information of each submodel. The electronic device 1000 may determine a processing device to process the identified submodel once again, and may request the determined processing device to process the identified submodel.

Accordingly, the electronic device 1000 according to an embodiment may determine whether an output of the result of the processing the submodel is delayed based on the guard time information, and may determine a processing device to process the submodel once again, such that the submodel may be completely processed as early as possible.

According to an embodiment, while each submodel is processed by each processing device, the synchronization information and the guard time information may be changed in real time according to a change in the situation of the processing device that is processing the submodel of operation 710. The electronic device 1000 according to an embodiment may periodically transmit the synchronization information and the guard time information, which are changed in real time, to each processing device.

FIG. 8 is a signal flow diagram illustrating an example method of performing distributed processing of an artificial intelligence model using a plurality of processing devices, according to various embodiments.

Referring to FIG. 8, in operations 810-1, 810-2, and 810-3, the electronic device 1000 according to an embodiment may receive registration information from the first processing device 110, the second processing device 120, and the third processing device 130. According to an embodiment, the electronic device 1000, the first processing device 110, the second processing device 120, and the third processing device 130 may be connected to the same network, and thus the registration information may be transmitted to the electronic device 1000.

According to an embodiment, the registration information may include information about the capability of each processing device. The electronic device 1000 according to an embodiment may determine processing devices to process submodels of an artificial intelligence model based on the registration information.

The electronic device 1000 according to an embodiment may register the first processing device 110, the second processing device 120, and the third processing device 130 in advance as processing devices that may be used for distributed processing of an artificial intelligence model, based on the received registration information.

In operation 820, the electronic device 1000 may receive a request for processing an artificial intelligence model, and accordingly, in operation 830, the electronic device 1000 may determine processing devices to process submodels of the artificial intelligence model, from among pre-registered processing devices.

According to an embodiment, the electronic device 1000 may perform an operation for processing the artificial intelligence model according to an internal operation of the electronic device 1000, but the disclosure is not limited thereto, and a request for processing the artificial intelligence model may be received from the outside.

In operation 830, the first processing device 110 and the second processing device 120 may be determined to process a plurality of submodels of the artificial intelligence model, and, in operations 840-1 and 840-2, the electronic device 1000 may transmit requests to process the plurality of submodels, to the first processing device 110 and the second processing device 120, respectively.

The electronic device 1000 according to an embodiment may further transmit synchronization information and guard time information for each submodel in addition to the requests transmitted in operations 840-1 and 840-2.

In operations 850-1 and 850-2, upon receipt of the requests to process the submodels, the first processing device 110 and the second processing device 120 may process a first submodel and a second submodel, respectively. In operations 860-1 and 860-2, results of the processing of the first submodel and the second submodel may be transmitted to the electronic device 1000.

In a case where the result of the processing the second submodel can be used for processing a portion of the first submodel, the electronic device 1000 may transmit the result of the processing the second submodel to the first processing device 110. However, the disclosure is not limited thereto, and the second processing device 120 may transmit the result of the processing of the second submodel directly to the first processing device 110.

In operation 870, the electronic device 1000 according to an embodiment may provide a user with various services, by performing the distributed processing of the artificial intelligence model based on the results of the processing of the plurality of submodels.

According to an embodiment, an artificial intelligence model may be rapidly processed using various devices around an electronic device without limitation in processing performance of the hardware of the electronic device.

A non-transitory computer-readable storage medium may be provided in a form of a non-transitory storage medium. The 'non-transitory computer-readable storage medium' refers to a tangible device and may not include a signal (e.g., an electromagnetic wave), and the 'non-transitory computer-readable storage medium' does not distinguish between a case where data is stored in a storage medium semi-permanently and a case where data is stored temporarily. For example, the non-transitory storage medium may include a buffer in which data is temporarily stored.

According to an embodiment, the method according to various embodiments disclosed herein may be included in a computer program product and provided. The computer program product may be traded between a seller and a purchaser as a commodity. The computer program product may be distributed in a form of a machine-readable storage medium (e.g., compact disk read only memory (CD-ROM)), or may be distributed online (e.g., downloaded or uploaded) through an application store (e.g., Google Play™) or directly between two user devices (e.g., smartphones). In the case of online distribution, at least a portion of the computer program product (e.g., a downloadable app) may be temporarily stored in a machine-readable storage medium such as a manufacturer's server, an application store's server, or a memory of a relay server.

In addition, in the disclosure, the term "unit" may be a hardware component such as a processor or a circuit, and/or a software component executed by a hardware component such as a processor.

While the disclosure has been illustrated and described with reference to various example embodiments, it will be understood that the various example embodiments are intended to be illustrative, not limiting. It will be understood by one of ordinary skill in the art that various changes in form and detail may be made without departing from the true spirit and full scope of the disclosure, including the appended claims and their equivalents. For example, the elements described as single entities may be distributed in implementation, and similarly, the elements described as distributed may be combined in implementation.

According to an embodiment, an artificial intelligence model may be rapidly processed using various devices around an electronic device without limitation in processing performance of the hardware of the electronic device.

What is claimed is:

1. A method, performed by an electronic device, of performing distributed processing of an artificial intelligence (AI) model, the method comprising:
    obtaining an AI model to be distributed and processed;
    dividing the AI model to obtain a plurality of submodels processable in parallel and having respective computational requirements;
    determining a first processing device from among a plurality of processing devices to process a first submodel requiring a highest computational requirements from among the respective computational requirements of the submodels;
    predicting a first processing time required for the first processing device to process the first submodel;
    determining a second processing device from among the processing devices to process a second submodel from among the submodels based on the predicted first processing time; and
    performing distributed processing of the AI model by requesting the first processing device and the second processing device to process the first submodel and the second submodel, respectively,
    wherein the method further comprises:
        determining guard time information based on adding a value to a predicted processing time required to process each submodel of at least one submodel among the plurality of the submodels;
        identifying a submodel for which a result of processing the at least one submodel is not output until a preset time point, based on the guard time information; and
        determining a processing device to process the identified submodel, and requesting the determined processing device to process the identified submodel.

2. The method of claim 1, wherein the determining of the second processing device comprises:
    identifying at least one processing device for which a second predicted processing time required to process the second submodel is less than or equal to the first predicted processing time; and
    determining the second processing device to process the second submodel from among the at least one identified processing device, based on at least one criterion other than the second predicted processing time required for each processing device to process the second submodel.

3. The method of claim 1, further comprising adjusting a speed at which the second processing device processes the second submodel based on the predicted first processing to to completely process the second submodel within the first processing time.

4. The method of claim 1, wherein the dividing of the AI model is based on portions of the AI model for which processing by one or more of the processing devices may be accelerated according to hardware characteristics of the processing devices.

5. The method of claim 1, wherein the AI model is divided into the plurality of submodels based on a branch point and a junction point included in the AI model.

6. The method of claim 1, wherein, based on one or more of the processing devices comprising a plurality of hardware units, determining the second processing device switching times required for the plurality of hardware units of the respective one or more of the processing devices to be switched to operate.

7. An electronic device configured to perform distributed processing of an (AI) model, the electronic device comprising:
    memory storing information of an AI model to be distributed and processed;
    at least one processor configured to:
        divide the AI model to obtain a plurality of submodels processable in parallel and having respective computational requirements,
        determine a first processing device from among a plurality of processing device to process a first submodel requiring a highest computational requirements from among the respective computational requirements of the submodels,
predict a first processing time required for the first processing device to process the first submodel, and
determine a second processing device from among the processing devices to process a second submodel from among the submodels based on the first predicted processing time; and
a communication unit comprising circuitry configured to transmit, to the first processing device and the second processing device, information for requesting to process the first submodel and the second submodel, respectively,
wherein the at least one processor is configured to:
determine guard time information based on adding a value to a predicted processing time required to process each submodel of at least one submodel among the plurality of the submodels;
identify a submodel for which a result of processing the at least one submodel is not output until a preset time point, based on the guard time information; and
determine a processing device to process the identified submodel, and request the determined processing device to process the identified submodel.

8. The electronic device of claim 7, wherein the at least one processor is further configured to:
identify at least one processing device for which a second predicted processing time required to process the second submodel is less than or equal to the first predicted processing time, and
determine the second processing device to process the second submodel from among the at least one identified processing device, based on at least one criterion other than the predicted second processing time required for each processing device to process the second submodel.

9. The electronic device of claim 7, wherein the at least one processor is further configured to:
adjust a speed at which the second processing device processes the second submodel based on the predicted first processing time to completely process the second submodel within the first processing time.

10. The electronic device of claim 7, wherein the dividing of the AI model is based on portions of the AI model for which processing by one or more of the processing devices may be accelerated according to hardware characteristics of the processing devices.

11. The electronic device of claim 7, wherein the at least one processor is configured to divide the AI model into the plurality of submodels based on a branch point and a junction point included in the AI model.

12. The electronic device of claim 7, wherein the at least one processor is configured to, based on one or more of the processing devices comprising a plurality of hardware units, determine the second processing device based on switching times required for the plurality of hardware units of the respective one or more of the processing device to be switched to operate.

13. A non-transitory computer-readable recording medium having recorded thereon a program which, when executed by at least one processor, causes the at least one processor to perform:
obtaining an artificial intelligence (AI) model to be distributed and processed;
dividing the AI model to obtain a plurality of submodels processable in parallel and having respective computational requirements;
determining a first processing device from among a plurality of processing devices to process a first submodel requiring a highest computational requirements from among the respective computational requirements of the submodels;
predicting a first processing time required for the first processing device to process the first submodel;
determining a second processing device from among the processing devices to process a second submodel from among the submodels based on the predicted first processing time;
performing distributed processing of the AI model by requesting the first processing device and the second processing device to process the first submodel and the second submodel, respectively;
determining guard time information based on adding a value to a predicted processing time required to process each submodel of at least one submodel among the plurality of the submodels;
identifying a submodel for which a result of processing the at least one submodel is not output until a preset time point, based on the guard time information; and
determining a processing device to process the identified submodel, and requesting the determined processing device to process the identified submodel.

* * * * *